United States Patent [19]

Pico, deceased et al.

[11] 4,115,507

[45] * Sep. 19, 1978

[54] MANUFACTURE OF ABRASION-RESISTANT SCREENING APPARATUS

[76] Inventors: Francisco Antonio Pico, deceased, late of Chihuahua, Mexico; James J. Shanley, personal representative, 10910 Picasso La., Potomac, Md. 20854

[ * ] Notice: The portion of the term of this patent subsequent to Aug. 3, 1993, has been disclaimed.

[21] Appl. No.: 711,212

[22] Filed: Aug. 3, 1976

Related U.S. Application Data

[63] Continuation-in-part of Ser. No. 69,813, Sep. 4, 1970, Pat. No. 3,972,974.

[51] Int. Cl.2 .......................... B29D 3/02; B29D 9/00; B29G 7/00

[52] U.S. Cl. .................................... 264/267; 264/269; 264/273; 264/275; 264/299

[58] Field of Search ............... 264/259, 267, 269, 255, 264/299, 266, 325, 275, 251, 254, 273, 800; 249/83, 91; 425/129, 110, 117, 412

[56] References Cited

U.S. PATENT DOCUMENTS

| | | | |
|---|---|---|---|
| 1,558,505 | 10/1925 | Ray | 264/259 |
| 1,702,958 | 2/1929 | Bard | 264/255 |
| 2,030,132 | 2/1936 | Apple | 425/412 |
| 2,995,782 | 8/1961 | Heller | 264/275 |
| 3,150,220 | 9/1964 | Howell | 249/83 |

*Primary Examiner*—Willard E. Hoag
*Attorney, Agent, or Firm*—Shanley, O'Neil and Baker

[57] ABSTRACT

Manufacture of a perforate screening member having a structurally strong substrate supporting a layer or coating of abrasion-resistant elastomer, the elastomer having perforations coincidental with perforations in the substrate, the perforations in the elastomer in some cases being smaller in cross sectional area than the perforations in the substrate and in some cases having sidewalls which taper downwardly and outwardly, by forming a layer or coating of flowable, hardenable elastomer on the upper surface of the substrate while the substrate has its perforations blocked by forms which project through the layer of elastomer, the upper section of the form in some cases being of smaller diameter throughout the thickness of the layer of elastomer than the diameter of the substrate perforation and in some cases tapering upwardly and inwardly. An elastomer treatable by heat and pressure, such as crude rubber, can form the abrasion-resistant layer or coating on the substrate and can be treated, as by vulcanization, in the same mold. Where the substrate is formed of a castable material, the same mold can be used to cast the substrate as is used to form the elastomer coating on the substrate after the latter has hardened.

26 Claims, 12 Drawing Figures

FIG. 1 PRIOR ART PRODUCT
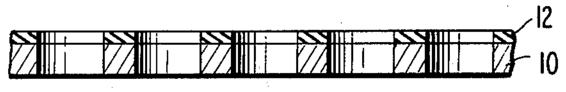
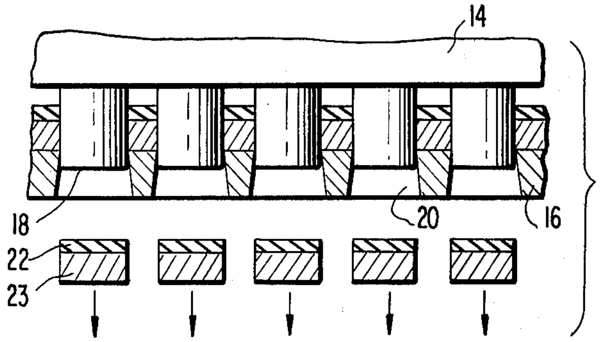
FIG. 2 PRIOR ART METHOD
FIG. 3
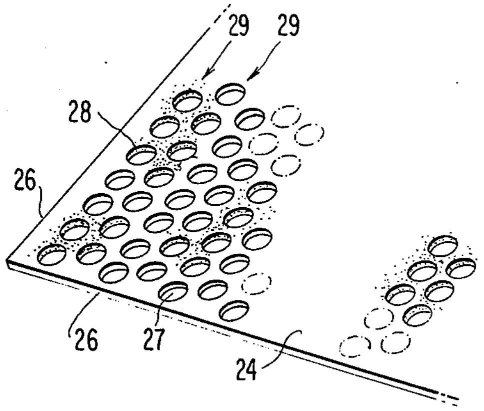
FIG. 4
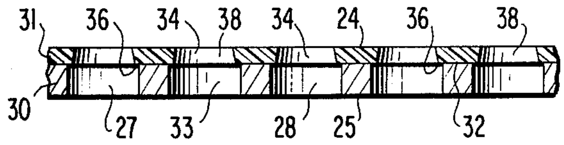
FIG. 5
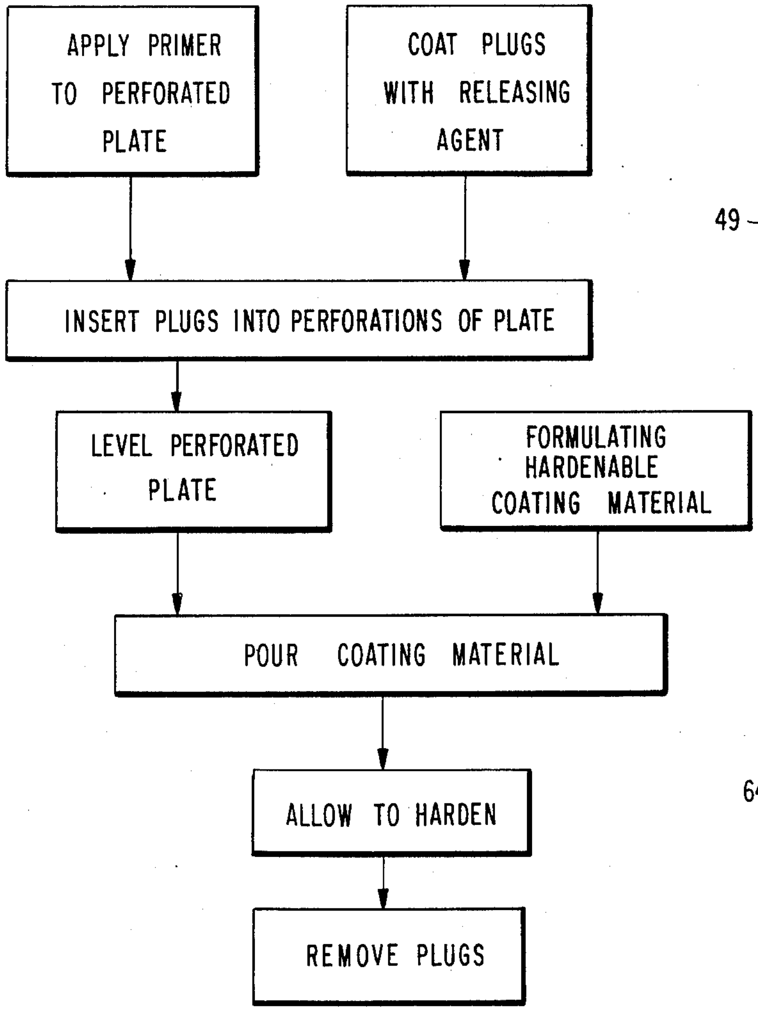
FIG. 6
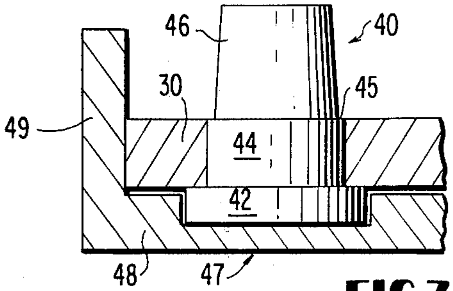
FIG. 7
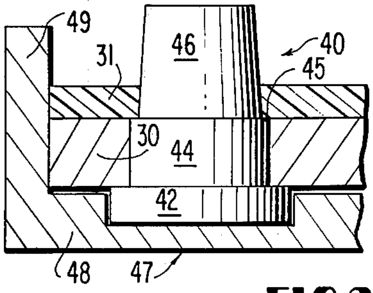
FIG. 8
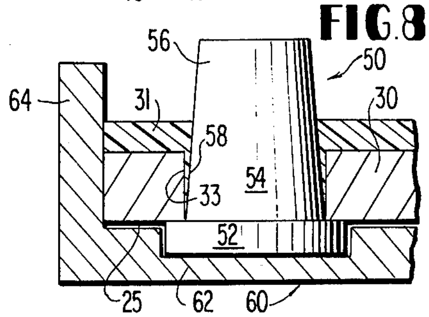

FIG. 9
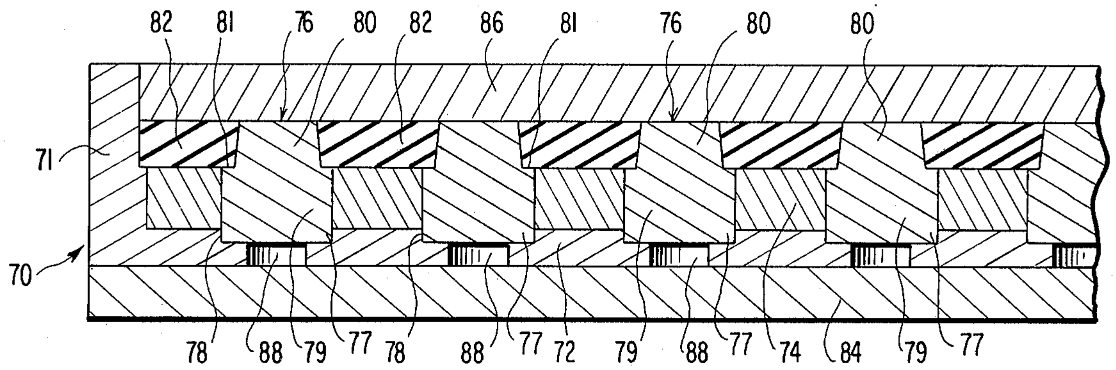
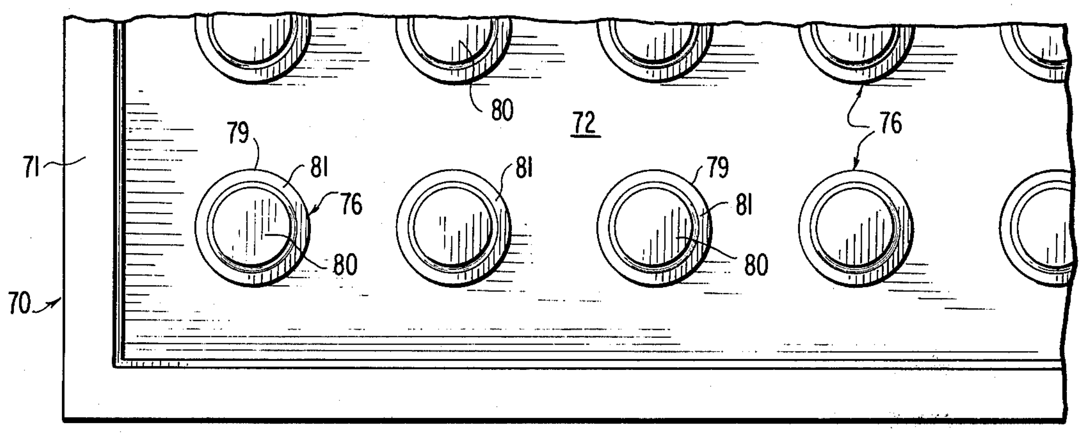
FIG. 10
FIG. 11
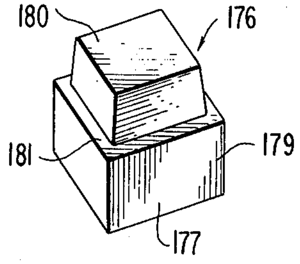
FIG. 12
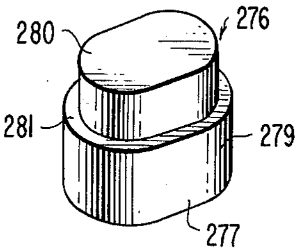

MANUFACTURE OF ABRASION-RESISTANT SCREENING APPARATUS

CROSS-REFERENCE TO RELATED APPLICATION

This is a continuation in part of my copending application Ser. No. 69,813 filed Sept. 4, 1970, now U.S. Pat. No. 3,972,974.

BACKGROUND OF THE INVENTION

The type of apparatus produced by the method of the present invention separates mixtures into resultant portions consisting of particles of more uniform size than those of the original mixture or in some situations is used to separate materials of different specific gravities. This type of apparatus is used in the fields of mining, construction and agriculture for respectively screening ore, sand, gravel and grain.

The abrasive nature of the material which is screened coupled with typical almost constant use of the apparatus progressively deteriorates unprotected apparatus, requiring frequent replacement.

BRIEF SUMMARY OF THE INVENTION

The method of the present invention embraces a method of coating a perforated substrate to produce a screening member of increased abrasion resistance, the substrate having upper and lower major surfaces and having perforations defined by sidewalls extending between said major surfaces, said method comprising the steps of providing a plurality of forms, each form having a base portion and a pair of consecutively superposed sections carried by the base section, the lower section contiguous to the base having sidewalls not greater in size and shape than the sidewalls of a perforation, the upper section having sidewalls inwardly spaced from the sidewalls of the first upper section, the cross sectional area of the upper section in planes parallel to the upper major surface of the substrate not increasing throughout the height of the upper section, the base portion being designed to limit movement of the form relative to the lower major surface of the substrate, positioning a form in each perforation with the base portion contiguous to the lower major surface of the substrate, with at least the lowermost portion of the lower section embraced by the sidewalls of the perforation and with the upper section protruding above the upper major surface of the substrate, forming a layer of hardenable elastomer in a plastic state on the upper surface of the substrate to a depth not greater than the height of the upper portion of the form, hardening the elastomer to form a coating of abrasion-resistant elastomer adhered to the upper surface of the substrate and surrounding the upper portion of the form, and removing the form after the layer of abrasion-resistant elastomer is formed.

The method of the present invention also embraces a method of forming a perforated substrate having an abrasion-resistant coating layer thereon comprising providing a mold having a bottom and sidewalls, the height of the sidewalls being greater than the thickness of the substrate and desired coating layer combined, the bottom supporting a plurality of upstanding forms, each form having a pair of sections one superposed on the other, the sidewalls of the lower section of each form corresponding in height and shape to the sidewalls of perforations in a substrate to be placed in the mold, the sidewalls of the upper section of each form being concentrically disposed relative to the sidewalls of the lower section and corresponding in shape to the desired sidewalls of perforations in the abrasion-resistant coating layer, the cross sectional area of the upper section of each form in planes normal to the height dimension of the form being of decreasing cross sectional area upwardly throughout the height dimension of the form corresponding to the thickness of the desired coating layer, placing a substrate in the mold with the lower section of a form filling each perforation in the substrate and with the top surface of the substrate exposed, placing a layer of material which in final form is abrasion-resistant within the mold in contact with the exposed surface of the substrate confined by the sidewalls of the mold and contiguous to the sidewalls of the upper sections of the forms, hardening the layer of material to make the material abrasion-resistant, and adhering the material to the substrate to form a layer of abrasion-resistant coating on the substrate, the last two steps taking place in any order or simultaneously.

BRIEF DESCRIPTION OF THE SEVERAL VIEWS OF THE DRAWING

FIG. 1 is a vertical sectional view of prior art screening apparatus which is deficient from an abrasion-resistant standpoint;

FIG. 2 is a schematic illustration of a conventional method of forming the structure of FIG. 1;

FIG. 3 is a fragmentary perspective view of screening apparatus within the scope of the present invention;

FIG. 4 is a view in vertical section of a portion of a screening member incorporating the present invention;

FIG. 5 is a schematic illustration of steps in a preferred method for manufacturing the apparatus of FIG. 3;

FIGS. 6 and 7 are vertical sectional views illustrating apparatus for carrying out and certain steps in a FIG. 5 method;

FIG. 8 is a view in vertical section illustrating apparatus for producing a modified form of screening member by a variant of the method of the invention;

FIG. 9 is a view in vertical section of a further modified form of apparatus for carrying out another variant of the present invention;

FIG. 10 is a view in plan of the apparatus of FIG. 9; and

FIGS. 11 and 12 are perspective views of examples of different shaped forms.

DETAILED DESCRIPTION OF THE PREFERRED EMBODIMENTS OF THE PRESENT INVENTION

A prior art screening member depicted in FIG. 1 consists of a perforate metal plate 10 having its upper working surface covered with a protective coating of rubber or rubber-like substance as shown at 12 to impart abrasion resistance. While this apparatus is superior in abrasion-resistance compared to a bare metal plate, it eventually deteriorates due to abrasion at perforation sidewalls of the metal plate.

This prior art screening member can be produced by adhering a rubber sheet to the top surface of a metal plate and then perforating the covered plate. Apparatus perforating the covered plate is shown in FIG. 2. It consists of an upper punch carrying member 14 and a lower die support member 16 which have cooperating punches 18 and dies 20, respectively. The rubber covered plate is positioned on die support member 16. Punch carrying member 14 is then moved toward die support member 16 to carry out the perforating. The material which is punched out, including coating portions 22 and metal portions 23, is disposed to waste.

It has been proposed to form a rubber-covered screening member by molding rubber around a metal substrate which is already perforated or of wire screen form, as in U.S. Pat. No. 1,718,385 and Australian Pat. No. 108,053. A screen produced in this manner incorporates an excess of rubber disposed throughout the screen where it serves no useful purpose. The elastomer coating material designed for resistance to abrasion is expensive and its waste cannot be economically tolerated.

Preferred screening apparatus within the scope of this invention, shown in FIGS. 3 and 4, has a narrow-thickness rectangular parallel piped configuration. It has an upper surface 24, a lower surface 25 and side surfaces 26. Perforations 27 extend upwardly from lower surface 25 through upper surface 24. Each perforation 27 is defined by a sidewall 28. The perforations 27 are of circular cross-section and are spaced apart in adjacent rows 29. Each row 29 extends along the length of the apparatus. Perforations in adjacent rows are longitudinally offset from one another.

The apparatus comprises a substrate 30 and a coating 31. Substrate 30 has an upper major surface 32, and lower major surface which is coextensive with lower surface 25 of the screening apparatus. The substrate perforations 27 have cylindrical interior sidewall surfaces 33 which are perpendicular to the upper and lower major surfaces of the substrate. Surfaces 32 and 25 are substantially planar. Coating 31 is supported on and adhered to the surface 32 of the substrate. Openings 34 in the coating are coincident with perforations 27 but are smaller in diameter than openings 27 so that there is a ledge 36 formed by coating 31 overhanging each cylindrical sidewall surface 33 of perforations 27. This overhang or ledge 36 is great enough so that objects passing through the opening 34 in the coating will not contact and abrade the cylindrical sidewalls 33 of the substrate. Each opening 34 in coating 31 has a sidewall surface 38 in the form of a truncated cone, greatly exaggerated in the drawing. Here again due to the tapering effect of sidewalls 38 an object passing through an opening 34 will not engage sidewalls 38 of coating 31 so as to become lodged in the coating.

The underlying substrate 30 can be of any material useful for structural purposes. Iron and steel are preferred structural materials. Other suitable materials for construction include other construction metals such as aluminum, certain plastics and wood. Although the perforations and openings are shown and described as being circular in this application, other cross-sectional shapes, such as elongated slots are within the scope of the present invention.

Ordinarily each of the perforations 27 has a diameter ranging from one-sixty fourth of an inch to five or more inches, preferably ranging from about one-eighth of an inch to about 2 inches.

The substrate ordinarily has a thickness ranging from one-sixteenth of an inch to four or more inches, preferably from about one-eighth to about three-fourths of an inch.

The coating 31 is of an elastomeric material which can be applied in pourable form and then hardened to solid form. Such materials are well known. Suitable materials include polyurethane and epoxy resins. A suitable polyurethane elastomer is sold under the trade name Flexane by Devcon Corporation of Cambridge, Massachusetts.

Preferably, the coating thickness at the substrate upper surface and at the perforation sidewall can range in various embodiments from about 1/16 inch to about ½ inch.

The application of protective coating to underlying substrate to produce the above described screening apparatus is illustrated in FIGS. 5–7.

The method of the present invention utilizes plugs or forms indicated generally at 40 in FIGS. 6 and 7. Each plug comprises a base portion 42 and a pair of sections 44 and 46, with a shoulder 45 therebetween, which are superposed on base portion 42. Lower section 44 has a cylindrical sidewall surface which is dimensioned and shaped to be received snugly within opening 27, the height of this section being the same as the thickness of the substrate 30. Upper section 46 has a sidewall in the form of a truncated cone, the amount of taper in this wall being greatly exaggerated in these figures. The height of upper section 46 can be appreciably greater than the desired thickness of the coating 31 but at least must be as great as the thickness of the coating.

Where desired the base portion 42 of each plug can sit in a recess of a mold or jig indicated generally at 47 having sidewalls 49 and a bottom 48 which holds all the plugs with some lateral tolerance in their proper position before insertion into perforations 27. Sidewalls 49 of mold 47 act as a dam for coating material 31. If desired, base portions 42 and ganging device 48 can be integral where lateral tolerance is not needed.

With reference to FIG. 5, a preferred coating process comprises the steps of applying primer to a perforated steel substrate plate, coating plugs with releasing agent, inserting the plugs into the perforations in the substrate to define molding cavities, then leveling the plate, formulating a hardenable elastomeric coating material, pouring or plastering the elastomeric material onto the top surface of the plate, allowing the elastomeric material to harden to form a coating and removing the plugs.

The primer is applied to cause later applied elastomer to adhere to the plate. The particular primer utilized depends on the particular elastomer utilized. The primers suitable for a particular elastomer are well known. A suitable primer for the "Flexane" polyurethane elastomer previously mentioned is sold under the trade name "Primer For Flexane" by Devcon Corporation.

The plugs are inserted into the perforations of the substrate. FIG. 6 shows a plug of preferred configuration in inserted position in a perforation. Section 42 has a diameter larger than the diameter of the perforation in plate 30 in order to prevent the plug from being inserted through the perforation.

Section 46 extends axially to a point sufficiently spaced past surface 32 so that it will extend beyond the applied coating. Preferably the plug extends past surface 32 a distance equal to at least twice the thickness of the coating to be applied to surface 32. In other words, when surface 32 is to be coated with ¼ inch of polyurethane, section 46 of plug 35 should protrude at least ½ inch above surface 32. Such protrusion facilitates removal of the plug after coating has been completed.

In some case the plugs are made of a plastic material for reasons of economy and quality control and because it is not essential to utilize a release agent with plugs of this material. In such cases the plugs are preferably of a thermoplastic material and very preferably of polyethylene. However there are situations in which the plugs are made of a metal, such as iron or aluminum or less desirably of wood or of wax.

The plugs 40 are preferably inserted pneumatically. Insertion by hand is also practical.

Treatment of plugs with releasing agent is not required if plastic plugs are utilized but can be required with non-plastic plugs to prevent elastomer from adhering to a plug. The use of a releasing agent is desirable no matter what material the plug is made of to facilitate its insertion (described previously) and its removal (described later). Suitable release agents include vaseline, wax, and mineral and petroleum oils.

Leveling of the plate permits the application of a uniform thickness coating to surface 32 where the applied elastomer is in liquid form and this is an advantage of free flowing material.

The elastomeric coating agent which is applied is preferably of pourable consistency. Ordinarily elastomeric agents are obtainable commercially in this form. In some cases, however, the elastomeric agent may be commercially obtained in solid form and melted to furnish a pourable or plasterable consistency for application or the agent may be of putty-like or plastic-like consistency and be spread or plastered on the substrate. In this specification and appended claims the term "plastic state" is used to describe an elastomer in pourable, plasterable or putty-like condition, i.e., not hardened into final abrasion-resistant form.

Just prior to application, the elastomeric substance to be applied is admixed with a curing agent to formulate a hardenable coating material. Such curing agents are well known in the art. A suitable curing agent for the "Flexane" polyurethane previously mentioned is sold under the trade name "Flexane Curing Agent". Alternatively where crude rubber or other vulcanized material is used, metal plates can be used to heat the vulcanizable material from the top and through the substrate. In such case the plugs would of course not protrude above the surface of the vulcanizable material.

The hardenable coating material can simply be poured out of a ladle onto surface 32. It can be kept from overflowing the sidewalls of plate 30 by any suitable method, for example, by utilizing dams. The amount of the material to be poured is readily calculated and is a function of the surface area 32 and the coating thickness desired.

Hardening occurs to a degree suitable for demolding in a time ranging from about 2 hours to about 24 hours. In other words the plug inserts can be removed within this time period. Hardening to full strength occurs in a period ranging from about 1 day to about 7 days. The application of heat can accelerate the hardening. The technology relating to curing times and the acceleration of these times by the application of heat is well known in the art.

FIG. 7 shows the coating in place after the hardening step and before the plugs have been removed.

Plug removal is suitably carried out pneumatically or by hand. If the plugs are of a material meltable at low temperature such as wax, they may be removed by the application of heat causing melting of the plug material.

The plate to be coated can have any predetermined pattern of perforations. Moreover, the perforations can be of cross sectional configuration other than circular, for example, square or rectangular; suitable adjustment is made in the shape and dimensions of the plug members.

Moreover, the thickness of the coating on surface 32 (FIGS. 4 and 7) can be varied from portion to portion of the surface where desired by inclining plate 30 during the pouring step instead of maintaining its level.

FIG. 8 discloses a modification of the present invention. In this embodiment the plugs or forms, indicated generally at 50, have a base portion 52, a lower section 54 and an upper section 56. Lower section 54 and upper section 56 can merge together without being distinguishable from one another by following a frusto-conical shape all the way from base member 52. The lowermost portion of section 54 can have the same shape and diameter as perforation 27 whereby the plug will be properly positioned in the perforation when driven home with the base portion 52 up against lower surface 25 of the substrate 30. Using this form of plug, some of the flowable coating lines the sidewalls 33 of perforation 27 while the downwardly and outwardly tapered opening is still presented to material being treated by the screening member. As in the previously described embodiment, the sidewalls 33 of the substrate are protected by the downward and outward taper of the coating opening sidewalls 58. A mold or gang jig indicated generally at 60 having a bottom 62 and sidewalls 64 can be used as in the preceding embodiment.

Turning now to FIGS. 9 and 10, apparatus is shown for carrying out the present invention where the elastomer material is of a nature, such as rubber, which can be vulcanized or hardened by heat and pressure. In this variant of the invention, a mold indicated generally at 70 is used having sidewalls 71 and a bottom wall 72. This mold can be rectangular as shown or have any configuration which will accommodate a screen member of the desired shape. In the illustrated form, the substrate of metal or any material of requisite strength is shown at 74 received in the bottom of mold 70. Plugs indicated generally at 76 can have their lowermost portions 77 frictionally held in depressions 78 formed in the bottom 72 of mold 70 or where desired depressions 78 can be dimensioned with some tolerance to permit slight lateral movement of the plugs to accommodate a solid substrate. These plugs correspond in this variant of the invention to base portion 42 and sections 44 and 46 of the plugs in the first described variant. In the variant of the method illustrated in FIGS. 9 and 11, the lower and upper sections of the plugs above lowermost portion 77 are designated by the reference numerals 79 and 80, respectively, with a shoulder 81 between them. The upper section 80 can be cylindrical or any other shape where desired, instead of tapered as shown, so long as the cross sectional area in planes normal to the height dimension of the plug does not prevent withdrawal of the plug from the final abrasion-resistant coating.

The elastomeric coating substance in the form of a layer of raw material which in final form is abrasion-resistant is shown at 82. As will be evident from the preceding description, the raw material 82 is poured, plastered or placed in any convenient manner on top of substrate 74 in such depth or thickness as will achieve a final form of abrasion-resistant elastomeric coating on the substrate which is of the same height as plugs 76 after vulcanization or heat and pressure treatment. When the raw or untreated material has been placed in position, a lower heat treating plate 84 and an upper heat treating and pressure applying plate 86 are brought into contact with the bottom of the mold and the top of the raw material, respectively. Heat is supplied to plates 84 and 86 and where necessary pressure is applied to plate 86 so that material 82 is vulcanized or heat cured in the desired thickness, which preferably corresponds to the height of upper section 80 of plugs 76. It will be noted that where compressing action is necessary, plugs 76 will act as a stop for upper heat treating plate 86 and with the proper amount of material 82 originally on the surface of substrate 74, the height of plugs 76 will act to stop the compressing action at the desired depth of thermoplastic material.

When the vulcanization, curing or desired heat treatment of material 82 is completed, plates 84 and 86 are removed and the coated screening member can be removed from mold 70 in finished condition. As mentioned earlier in connection with the first described variant of the method, plugs 76 where desired can have previously been coated with a material which will facilitate their withdrawal. In case the plugs adhere to the substrate and/or the thermoplastic material and hinder extraction of the completed screen member from the mold, the plugs can be loosened by tapping their bottoms through openings 88 in the bottom 72 of mold 70. Of course, with the completed screening member removed from mold 70, any plugs retained in the coated screen can be removed by tapping them from the top or coated side of the screen.

A special advantage of this variant of the invention is that substrate 74 can also be formed in situ in mold 70 where the material of the substrate is of a castable nature, such as aluminum, fiberglass or any plastic material structurally strong enough to support abrasion-resistant elastomer coating 82 to form a satisfactory screen member. In such case, this variant of the method need not necessarily involve a heat treatable coating 82 but can use the same type of coating previously described in respect to the variant illustrated in FIGS. 5 to 8. In the variant of the invention in which the substrate is formed in situ in mold 70, plugs 76 (FIGS. 9–11) are securely positioned in depression 78 and the castable substrate material is poured into the mold to a depth flush with shoulders 81 on plugs 76. When the substrate material has hardened, the method proceeds as described above. It is conceivable that the substrate can be made from hard rubber or some such material that would be brought to its final shape, hardness and strength by heat treatment and it will be obvious in such case that the plates 84 and 86 can be used for this purpose at the same time as the coating is heat treated or a specially shaped plate can be substituted for plate 86 to heat treat and apply pressure to substrate 74 separately and prior to the heat treatment of thermoplastic material 82.

FIGS. 11 and 12 show two additional examples of plugs or forms. In these figures the same reference numerals are applied to similar parts but with 100 being added in FIG. 11 and 200 in FIG. 12. it will be noted that upper section 280 of FIG. 12 has walls which do not slope, this feature being desirable under some conditions in respect to all variants of the invention.

Where desired in this variant of the method and in the earlier described variants, the plugs can be formed of metal economically manufactured in large numbers by an ordinary metal injection molding machine. The elastomeric material may be placed on the upper surface of the substrate in laminated form or in whatever form is most convenient considering its consistency. The heat treatable form of coating can be crude rubber in putty-like consistency or any of the many substances of similar characteristics now available. Where heat treatment alone is involved the material 82 may be NYLON, DERLIN, polyethylene or similar substances.

The above described variants of the invention are to be considered in all respects as illustrative and not restrictive since the invention may be carried out differently without departing from its spirit or essential characteristics. Therefore, the scope of the invention is indicated by the claims rather than by the foregoing description, and all changes which come within the meaning and range of the equivalents of the claims are intended to be embraced therein.

What is claimed is:

1. A method of coating a perforated substrate to produce a screening member of increased abrasion resistance, the substrate having upper and lower major surfaces and having perforations defined by sidewalls extending between said major surfaces, said method comprising the steps of providing a plurality of forms, each form having a base portion and a pair of consecutively superposed sections carried by the base section, the lower section contiguous to the base having sidewalls not greater in size and shape than the sidewalls of a perforation, the upper section having sidewalls inwardly spaced from the sidewalls of the first upper section, the cross sectional area of the upper section in planes parallel to the upper major surface of the substrate not increasing throughout the height of the upper section, the base portion being designed to limit movement of the form relative to the lower major surface of the substrate, positioning a form in each perforation with the base portion contiguous to the lower major surface of the substrate, with at least the lowermost portion of the lower section embraced by the sidewalls of the perforation and with the upper section protruding above the upper major surface of the substrate, forming a layer of hardenable elastomer in a plastic state on the upper surface of the substrate to a depth not greater than the height of the upper portion of the form, hardening the elastomer to form a coating of abrasion-resistant elastomer adhered to the upper surface of the substrate and surrounding the upper portion of the form, and removing the form after the layer of abrasion-resistant elastomer is formed.

2. The method of claim 1 in which the upper section of each form has sidewalls sloping upwardly and inwardly, and the rate of slope of the upper section sidewalls is between about 0.0001 inch and about 0.01 inch for each ¼ inch thickness of coating.

3. The method of claim 1 in which the upper section of each form has sidewalls sloping upwardly and inwardly.

4. The method of claim 3 in which the upper section of each form has frusto-conical sidewalls.

5. The method of claim 4 in which the rate of slope of the upper section sidewalls is between about 0.0001 inch and about 0.01 inch for each ¼ inch thickness of coating.

6. The method of claim 1 in which the sidewalls of the lower section of each form correspond in size and shape to the sidewalls of a substrate perforation.

7. The method of claim 6 in which the shape of the sidewalls of the lower section of each form is cylindrical.

8. The method of claim 7 in which the upper section of each form has sidewalls sloping upwardly and inwardly.

9. The method of claim 8 in which the upper section of each form has frusto-conical sidewalls.

10. The method of claim 9 in which the rate of slope of the upper section sidewalls is between about 0.0001 inch and about 0.01 inch for each ¼ inch thickness of coating.

11. A method of forming a perforated substrate having an abrasion-resistant coating layer thereon comprising providing a mold having a bottom and sidewalls, the height of the sidewalls being greater than the thickness of the substrate and desired coating layer combined, the bottom supporting a plurality of upstanding forms, each form having a pair of sections one superposed on the other, the sidewalls of the lower section of each form corresponding in height and shape to the sidewalls of perforations in a substrate to be placed in the mold, the sidewalls of the upper section of each form corresponding in shape to the desired sidewalls of perforations in the abrasion-resistant coating layer, the cross sectional area of the upper section of each form in planes normal to the height dimension of the form being of decreasing cross sectional area upwardly in the height dimension of the form corresponding to the thickness of the desired coating layer, placing a substrate in the mold with the lower section of a form filling each perforation in the substrate and with the top surface of the substrate exposed, placing a layer of material which in final form is abrasion-resistant within the mold in contact with the exposed surface of the substrate, confined by sidewalls of the mold and contiguous to the sidewalls of the upper sections of the forms, hardening the layer of material to make the material abrasion-resistant, and adhering the material to the substrate to form a layer of abrasion-resistant coating on the substrate, the last two steps taking place in any order or simultaneously.

12. The method of claim 11 in which the substrate is placed in the mold in liquid form and hardened to form the perforated substrate.

13. The method of claim 11 in which the upper section of each form has frusto-conical sidewalls.

14. The method of claim 13 in which said cross sectional area of the upper section of each form decreases upwardly at a rate between about 0.0001 inch and about 0.01 inch for each ¼ inch of thickness of the coating.

15. The method of claim 14 in which the substrate is placed in the mold in liquid form and hardened to form the perforated substrate.

16. The method of claim 11 in which the material of the layer of material is an elastomer initially in a plastic state, the hardening step involves curing the material to final abrasion-resistant form, and the adhering step involves creating an adhesive action at the interface between the exposed top surface of substrate and the abrasion-resistant coating.

17. The method of claim 16 in which the substrate is placed in the mold in liquid form and hardened to form the perforated substrate.

18. The method of claim 16 in which the upper section of each form has frusto-conical sidewalls.

19. The method of claim 18 in which said cross sectional area of the upper section of each form decreases upwardly at a rate between about 0.0001 inch and about 0.01 inch for each ¼ inch of thickness of the coating.

20. The method of claim 19 in which the substrate is placed in the mold in liquid form and hardened to form the perforated substrate.

21. The method of claim 11 in which the material of the layer of material is a soft, rubbery substance, and the hardening step is a vulcanizing step under heat and pressure.

22. The method of claim 21 in which the upper section of each form has sidewalls sloping upwardly and inwardly, and the rate of slope of the upper section sidewalls is between about 0.0001 inch and about 0.01 inch for each ¼ inch thickness of coating.

23. The method of claim 21 including providing a plate means having a lower planar surface corresponding in area to the desired upper surface of the final form of the layer of abrasion-resistant coating, at least some of the forms including stop means, the height dimension of the stop means corresponding to the thickness of the final layer of abrasion-resistant coating, placing the plate means in heat and pressure supplying relation to the layer of raw material, supplying heat and pressure to the plate means until the plate means engage the form stop means and the layer of material is in abrasion-resistant form.

24. The method of claim 21 in which the upper section of each form has sidewalls slopand inwardly.

25. The method of claim 24 in which the upper section of each form has frusto-conical sidewalls.

26. The method of claim 25 in which the rate of slope of the upper section sidewalls is between about 0.0001 inch and about 0.01 inch for each ¼ inch thickness of coating.

* * * * *